US010664162B2

(12) United States Patent
Strode

(10) Patent No.: US 10,664,162 B2
(45) Date of Patent: May 26, 2020

(54) MULTIPLE DISPLAY MANAGEMENT

(71) Applicant: Red Hat, Inc., Raleigh, NC (US)

(72) Inventor: Maureen Emily Strode, Cambridge, MA (US)

(73) Assignee: Red Hat, Inc., Raleigh, NC (US)

( * ) Notice: Subject to any disclaimer, the term of this patent is extended or adjusted under 35 U.S.C. 154(b) by 637 days.

(21) Appl. No.: 14/082,515

(22) Filed: Nov. 18, 2013

(65) Prior Publication Data

US 2015/0143266 A1    May 21, 2015

(51) Int. Cl.
*G06F 3/00* (2006.01)
*G06F 3/0489* (2013.01)
*G06F 3/0481* (2013.01)
*G06F 3/14* (2006.01)

(52) U.S. Cl.
CPC ........ *G06F 3/0489* (2013.01); *G06F 3/04812* (2013.01); *G06F 3/1446* (2013.01); *G09G 2356/00* (2013.01)

(58) Field of Classification Search
CPC ...... G06F 3/048; G06F 3/0481; G06F 3/0484; G06F 3/04842; G06F 3/04845; G06F 3/0486; G06F 3/0489
See application file for complete search history.

(56) References Cited

U.S. PATENT DOCUMENTS

| 5,408,659 | A | * | 4/1995 | Cavendish | ........ G06F 17/30607 715/804 |
|---|---|---|---|---|---|
| 5,585,821 | A | * | 12/1996 | Ishikura | ................ G06F 3/0481 345/1.1 |
| 5,917,486 | A | * | 6/1999 | Rylander | ................ G06F 3/038 345/157 |
| 5,929,840 | A | * | 7/1999 | Brewer | ............... G06F 3/04812 345/157 |
| 6,005,549 | A | * | 12/1999 | Forest | ..................... G06F 3/011 345/157 |
| 6,469,717 | B1 | * | 10/2002 | Wineke | ............... G06F 3/04845 715/765 |

(Continued)

FOREIGN PATENT DOCUMENTS

| CN | 102314329 | 1/2012 |
|---|---|---|
| CN | 103116460 | 5/2013 |

(Continued)

OTHER PUBLICATIONS

Superuser.com "How do I move My Current Active Window From One Monitor to Another Using a Keyboard Shortcut?", Jan. 18, 2011, retrieved from https://superuser.com/questions/234627/how-do-i-move-my-current-active-window-from-one-monitor-to-another-using-a-keybo/394861.

(Continued)

*Primary Examiner* — Tadesse Hailu
*Assistant Examiner* — Andrew Chung
(74) *Attorney, Agent, or Firm* — Lowenstein Sandler LLP

(57) ABSTRACT

A method and system for managing multiple displays, including receiving a first indication to allow movement of an object between a first display and a second display, allowing movement of the object between the first display and the second display in view of the first indication, receiving a second indication to prevent movement of the object between the first display to the second display, and preventing movement of the object between the first display and the second display in view of the second indication.

12 Claims, 8 Drawing Sheets

(56) References Cited

U.S. PATENT DOCUMENTS

| | | | | |
|---|---|---|---|---|
| 6,724,400 | B1* | 4/2004 | Anderson | G06F 3/016 715/762 |
| 6,903,723 | B1* | 6/2005 | Forest | A61F 4/00 345/157 |
| 7,124,374 | B1* | 10/2006 | Haken | G06F 3/038 715/761 |
| 7,477,233 | B2* | 1/2009 | Duncan | G06F 3/04883 178/18.01 |
| 7,620,886 | B1* | 11/2009 | Young | G06F 17/243 715/201 |
| 8,212,785 | B2* | 7/2012 | Min | G06F 3/04883 345/173 |
| 8,305,365 | B2* | 11/2012 | Takata | G06F 1/1626 345/184 |
| 8,352,879 | B2 | 1/2013 | Leung et al. | |
| 8,687,022 | B2* | 4/2014 | Cheon | G06F 3/04886 345/636 |
| 8,786,517 | B2* | 7/2014 | Lewin | G06F 3/1446 345/1.3 |
| 8,862,104 | B2* | 10/2014 | Mian | G06F 3/017 345/169 |
| 2002/0158846 | A1* | 10/2002 | Clapper | G06F 3/04892 345/168 |
| 2005/0289476 | A1* | 12/2005 | Tokkonen | G06F 3/038 715/769 |
| 2006/0143571 | A1* | 6/2006 | Chan | G06F 3/03543 715/764 |
| 2008/0109763 | A1* | 5/2008 | Lee | G06F 3/0488 715/856 |
| 2009/0319807 | A1* | 12/2009 | Chasen | G11B 20/00086 713/193 |
| 2010/0077335 | A1* | 3/2010 | Cheng | G06F 3/038 715/769 |
| 2010/0153878 | A1* | 6/2010 | Lindgren | G06F 3/0481 715/810 |
| 2011/0115688 | A1 | 5/2011 | Yu | |
| 2011/0199313 | A1* | 8/2011 | Tsai | G06F 3/0486 345/173 |
| 2012/0054637 | A1* | 3/2012 | Arrasvuori | G06F 3/0486 715/748 |
| 2012/0084688 | A1* | 4/2012 | Robert | G06F 3/04817 715/769 |
| 2012/0159398 | A1* | 6/2012 | Kurosawa | G06F 3/0482 715/841 |
| 2012/0227003 | A1* | 9/2012 | Chen | G06F 3/0486 715/765 |
| 2012/0236035 | A1* | 9/2012 | Kimura | G06F 3/0488 345/660 |
| 2012/0249429 | A1 | 10/2012 | Anderson et al. | |
| 2013/0042183 | A1* | 2/2013 | Martinez | G06F 3/0486 715/748 |
| 2013/0145291 | A1 | 6/2013 | Weber et al. | |
| 2013/0174062 | A1* | 7/2013 | Stoustrup | G06F 1/1616 715/761 |
| 2013/0179781 | A1 | 7/2013 | Nan et al. | |
| 2014/0195925 | A1* | 7/2014 | Wikander | G06F 3/017 715/748 |
| 2014/0208273 | A1* | 7/2014 | Moffett | G06F 3/013 715/856 |
| 2014/0245190 | A1* | 8/2014 | Bragdon | G06Q 10/1095 715/753 |
| 2014/0365957 | A1* | 12/2014 | Louch | G06F 3/1431 715/790 |
| 2014/0380187 | A1* | 12/2014 | Gardenfors | G06F 3/017 715/748 |
| 2015/0220149 | A1* | 8/2015 | Plagemann | G06F 3/017 715/856 |

FOREIGN PATENT DOCUMENTS

| | | | | |
|---|---|---|---|---|
| JP | 11282627 A | * | 10/1999 | G06F 3/033 |
| KR | 20110054353 | | 5/2011 | |

OTHER PUBLICATIONS

Microsoft.com "Move Windows Between Multiple Monitors", retrieved from http://windows.microsoft.com/en-in/windows7/move-windows-between-multiple-monitors, Nov. 19, 2013.

Ashdown, Mark et al. "Head Tracking and Mouse Input for a GUI on Multiple Monitors", Apr. 21, 2008, Institute of Industrial Science, The University of Tokyo, retrieved from http://www.youtube.com/watch?v=Jt5nhQiL4pY.

\* cited by examiner

350

10,664,162 B2

MULTIPLE DISPLAY MANAGEMENT

FIELD

Embodiments of the present disclosure relate to a method and system for multiple display management. Specifically, the embodiments of the present invention relate to a method and system for managing movement of an object between displays.

BACKGROUND

On many computing platforms, the operating system allows for the use of multiple displays. A desktop is shown on the multiple displays, where the desktop is a graphical user interface with icons and menus that allows access to files and programs for a particular computer system. In addition, executing programs are placed in windows (i.e., application windows) that are also displayed and managed on the desktop. Objects, such as a cursor, windows, and icons, can be moved between the displays.

When objects can be moved between displays, interaction issues can be encountered at the window boundaries, which can be characterized by Fitts's Law. According to Fitts's Law, targets placed along an edge or corner of a screen shown on a display are ergonomically easier for users to access. On a single display system, the screen area 'stops' at all edges, so, rather than finely targeting a cursor to a specific pixel region of the display, the user can bounce the cursor against a 'wall' where the cursor will automatically stop. The edge is effectively a backstop. Targets, such as scroll bars, are often placed along the edge of an application window that could coincide with a screen edge to take advantage of this effect. However, in a multiple display system, the 'wall' may not be present on the edge of the screen where the cursor can be moved from the current display to another display. Therefore, the cursor continues to move onto the other display unless the user finely targets the target.

In an example of a display system with a left display and a right display, a cursor located on the left display is typically moved to the right display through the right edge of the left display. If a web browser application window with a scroll at the right edge of the window is maximized in the left display, then a user must finely target the scroll bar with a pointer or cursor. If the user attempts to merely bounce the cursor off the right edge of the display, the cursor will move onto the right display. At a minimum, this effect can be frustrating for a user. However, depending on the applications in use, undesired movement of the cursor onto a different screen can lead to disastrous results.

BRIEF DESCRIPTION OF THE DRAWINGS

Various embodiments of the present disclosure will be understood more fully from the detailed description given below and from the accompanying drawings of various embodiments of the invention.

DETAILED DESCRIPTION

Figure 1:
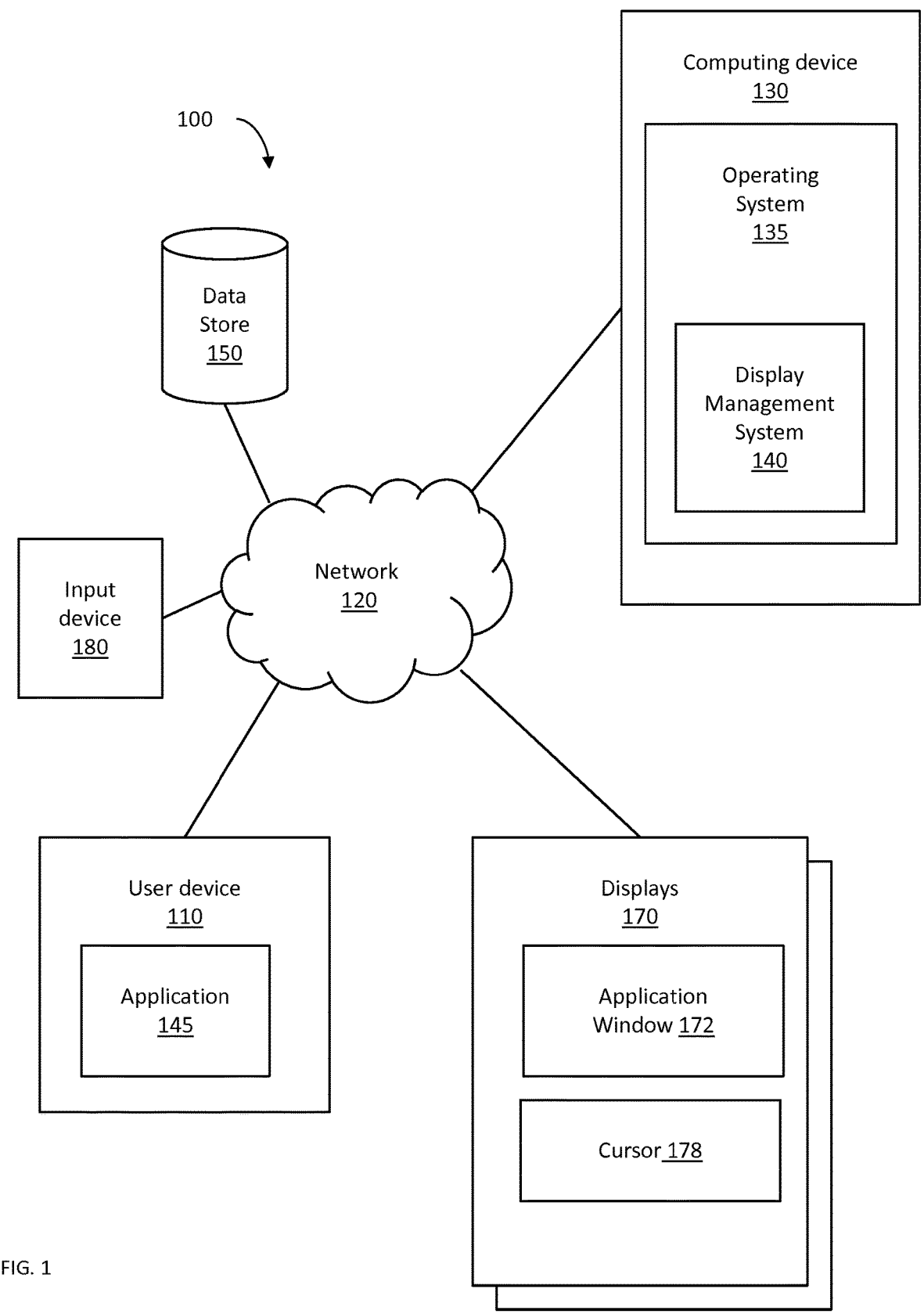
FIG. 1 illustrates exemplary system architecture, in accordance with various embodiments of the present disclosure.

Described herein is a method and system for managing multiple displays. An indication to allow movement of an object between a first display and a second display is received, and movement of the object from the first display to the second display is allowed based on the indication. Another indication to prevent movement of the object between the first display and the second display is received, and movement of the object between the first display and the second display is prevented in view of the second indication. For example, the object can be a cursor or an application window.

In one example, the indication can be a pressing down of a key on an input device or a releasing of a key, and movement of the object between the first display and the second display may only be allowed while the first key is held down. In another example, the indication can be a selection of a button embedded on one of the displays. For example, the button can be a virtual button (i.e., rendered in software and displayed on the display), or a hardware button, or an embedded touch panel button on the display.

Typically, when a user desires to move an object, such as a cursor or application window from one display to another, the movement is an explicit action that the user actively considers. However, multiple display systems allow passive interaction between displays, which is not necessarily logical considering the activeness with which users think about moving objects from one display to another.

According to aspects of the present disclosure, a series of modes can be set for the user to explicitly communicate with a computing system the user's intention to move an object, such as a cursor or an application window, from one display of a display system to another. In an example, as a default, a cursor is locked into a currently active display, as determined by where the cursor and/or application focus are currently located. The cursor then cannot leave the confines of the current display by default, with intervention of the user. As a result, the user can utilize the principle of Fitts's Law, where targets located at edges of the screen are easier to access because the cursor can be bounced (or slammed) against the edge to locate the cursor in the desired location. According to some implementations, the user should then provide an indication (e.g., pressing a key on a keyboard or using the cursor to select a button on the display) to the computer system to be able to move the cursor to the other display. Once the user has provided the indication, the user is then able to move the cursor to another display.

In other words, the user experiences that there is a 'gate' around the screen of the display where the cursor is located by default, such that the cursor cannot be moved off of that screen. The user can open the gate, for example, by pressing the designated key or selecting the designated button, such that the cursor can be moved off of that screen. As a result, the user can generally use the edges of the screen like a back stop to select objects located at the edges of the screen, but can make an intentional movement of the cursor past the edge onto another display when desired.

In an example, a computer system can have a drawing tablet display (e.g., that can be used with a specialized pen) as a primary display and a monitor as a secondary display. In this example, the user wants to draw a cartoon of a dinosaur. The user could open a web browser application window on the primary display and search for a reference picture of a dinosaur, during which the user can use the edges of the screen of the primary display as a backstop. Once the user locates a desired image, the user can provide an indicator (e.g., by pressing and holding down the F2 key) to open the gate from the primary display to the secondary display and use the cursor to drag the desired image over to the secondary display. The cursor is now located on the secondary display. The user can then release the F2 key which closes the gate from the primary display to the secondary display. The user can now provide an indicator (e.g., by pressing and holding down the F1 key) to open the gate from the secondary display to the primary display and move the cursor back onto the primary display. The user can then release the F1 key, which closes the gate from the secondary display to the primary display. Using the cursor, the user can now open a drawing application window on the primary display, and then start painting with broad sweeping strokes on the display with the pen without being concerned that the cursor will inadvertently move from the primary display to the secondary display.

FIG. 1 shows a block diagram of a system architecture 100 according to one embodiment. In one embodiment, a computing device 130, such as a personal computer, a laptop computer, a cellular telephone, a personal digital assistant (PDA), etc., includes an operating system 135 having a display management system 140 for managing objects, such as one or more cursors 178 and/or one or more application windows 172, displayed on multiple displays 170. The application windows 172 are graphical user interfaces of one or more applications 145 run on a user device 110 and/or one or more applications (not shown) run on the computing device 130 that can be controlled by a user through an input device 180, which may be a cursor control device (e.g., a mouse) and/or a keyboard. The user device 110 can be terminal, a mobile device such as a smart phone, a tablet computer, an appliance, etc. The applications 145 can be controlled by a user via a touch screen of the user device 110 or any other type of input device that is part of the user device 110 or attached to the user device 110. The computing device 130 may be part of an organization's network. The computing device 130 is coupled to the user device 110, the displays 170, the input device 180, and a data store 150 via a network 120, which may be a private network (e.g., a local area network (LAN), a wide area network (WAN), intranet, or other similar private networks) or a public network (e.g., the Internet). Alternatively, the data store 150, the displays 170, the input device 180, and the user device 110 are coupled directly to the computing device 130. Yet alternatively, the system 100 does not include the user device 110, and the application windows 172 pertain to one or more applications running on the computing device 130.

The display management system 140 can be a module of the operating system (OS) 135. According to an embodiment, the display management system 140 can manage movement of the cursor 178 and/or application window 172 between displays. The display management system 140 can receive one or more indicators from a user of the user device 110 through input device 180. The indicator can indicate whether movement of an object (e.g., application window 172 or cursor 178) between displays 170 is allowed.

The data store 150 includes information regarding the indicators and what each indicator indicates. For example, the data store 150 can include information about a first indicator indicating that a cursor can be moved from a first display to a second display. In another example, the data store 150 can include information about a second indicator indicating that a cursor is to be prevented from moving from a first display to a second display.

As the user views the displays 170, the user also views application windows 172 and a cursor 178. By providing input through input device 180 (e.g., a keyboard or a mouse), the user can manipulate the application windows 172 and the cursor 178

Figure 2:
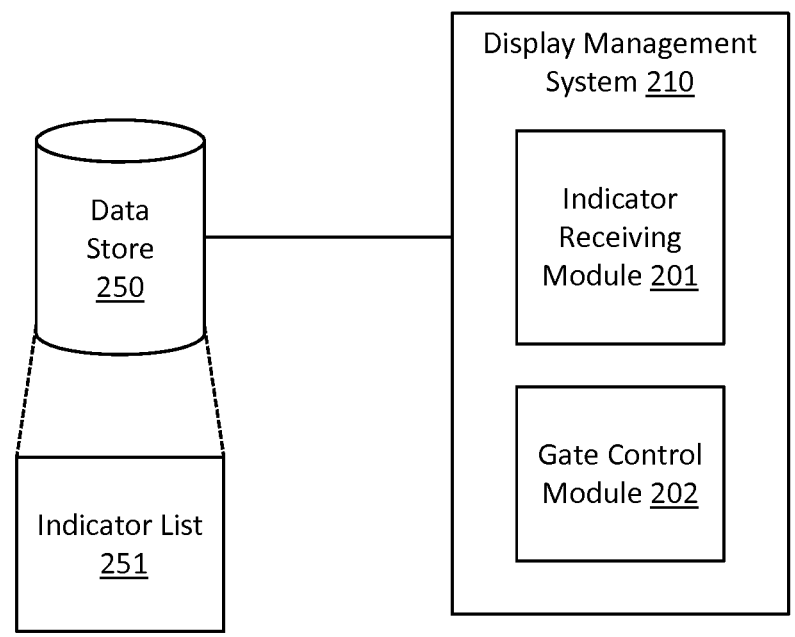
FIG. 2 illustrates a block diagram of an embodiment of a display management system and a data store.

FIG. 2 illustrates a display management system 210 and a data store 250 according to one embodiment. Here, the display management system 210 can be the same as the display management system 140 of FIG. 1, and the data store 250 can be the same as the data store 150 of FIG. 1. The display management system 210 includes an indicator receiving module 201 and a gate control module 202. Note that in alternative embodiments, the display management system 210 may include more or less modules than those shown in FIG. 2. Also, the indicator receiving module 201 and gate control module 203 may be combined into a single module. Additionally, the functionality of either the indicator receiving module 201 or the gate control module 203 may be divided between multiple modules.

In one embodiment, the indicator receiving module 201 receives an indicator. For example, a user can provide the indicator to the indicator receiving module 201 via a user device 110 or an input device 180. Examples of indicators include, but are not limited to, pressing a key on a keyboard, pressing and holding a key on a keyboard, pressing multiple keys on a keyboard (e.g., two or three keys), pressing and holding multiple keys on the keyboard, pressing a button or multiple buttons on a mouse, pressing and holding a button or multiple buttons on the mouse, using a cursor to select a button on a display, holding down a button on a mouse or keyboard to continue to select a button on the display, or any other suitable indicator.

The indicator receiving module 201 can access an indicator list 251 stored in data store 250 to determine what the indicator is indicating. The indicator list 251 includes a list of all of the indicators and the actions that should be taken upon receiving the indicator. Examples of action include, but are not limited to, allowing the user to move one or more cursors and/or application windows from one display to another, allowing the user to move one or more cursors and/or application windows between displays (e.g., between two displays, three displays or four displays), preventing the user from moving one or more cursors and/or application windows from one display to another, and preventing the user from moving one or more cursors and/or application windows between displays (e.g., between two displays, three displays, or four displays). In an example where there are three displays (e.g., Display A, Display B, and Display C) in a system of displays, a first indicator can indicate that movement between Display A and Display B only is allowed, a second indicator can indicate that movement between Display B and Display C only is allowed, and a third indicator can indicate that movement between Display C and Display A only is allowed. Other indicators could similarly indicate that movement between only certain displays of a system of displays is prevented. In another example, an indicator can indicate that movement between all of the displays (i.e., Display A, Display B, and Display C) is allowed.

Once the indicator receiving module 201 has determined the action that corresponds to the received indicator, the gate control module 202 can implement the corresponding action. For example, the gate control module 202 can either allow or prevent movement of one or more cursors and/or application windows between displays of a multiple display system.

After the gate control module 202 has implemented the action, the indicator receiving module 201 can receive additional indicators (e.g., either the same indicator or a different indicator) so that another action can be implemented by the gate control module 202.

In an example, to provide an indicator, the user presses and holds down the Alt and Shift keys on a display system with three displays. The indicator receiving module 201 receives the indicator and queries the indicator list 251 to determine the action that corresponds to the Alt and Shift keys being held down. According to the indicator list 251, the user pressing and holding down the Alt and Shift keys indicates that the user is allowed to move a cursor and any application windows between all three of the displays. Based on the action corresponding to the user-provided indicator, the gate control module 202 allows the user to move the cursor and any application windows as long as the user continues to hold down the Alt and Shift keys. In other words, the gate control module 202 opens 'gates' between all three of the displays. In this example, the user can use the cursor to select and drag an application window (e.g., a web browser) from a first display to a second display. The user can then move the cursor back to the first display. Once the user has moved the cursor and the application window to the desired displays, the user can release the Alt and Shift keys. The indicator receiving module 201 receives the release of these keys as an indicator. The indicator receiving module 201 can then query the indicator list 251 to determine the corresponding action. In this example, the action that corresponds to the release of the Alt and Shift keys is to prevent the movement of both cursors and application windows between any of the displays. Based on the action corresponding to the user-provided indicator, the gate control module 202 prevents the user from moving the cursor and any application windows between the displays. In other words, the gate control module 202 closes the 'gates' between the displays. Now the user can employ the edges of the screen of the first display, to which the cursor is now restricted, as a backstop.

In an embodiment, the user can use multiple input devices (e.g., two mice, three mice, or four mice) for the display system, where each input device controls a different cursor. Each mouse can control a separate cursor, where each cursor typically resides on a particular display. In an example where the display system has two displays, each display has a cursor that is controlled by a separate mouse. In other words, there is a first cursor controlled by a first mouse on the first display, and a second cursor controlled by a second mouse on a second display. The user can provide an indicator that movement between the displays is to be allowed (i.e, the 'gate' is opened). The user can then use the first cursor on the first display to drag an application window to the second display. When the user provides an indicator that movement between the displays is to be prevented (i.e., the 'gate' is closed), the first cursor is automatically returned to the first display. Now, the user can use the first mouse to control the first cursor to manipulate other objects on the first display and the second mouse to control the second cursor to manipulate the recently arrived application window or other objects on the second display.

In an embodiment, a physical button is present on displays of a multiple display system. A user can press, hold, and/or release the button to provide an indicator (e.g., to open or close one or more 'gates' between the displays).

Figure 3A:
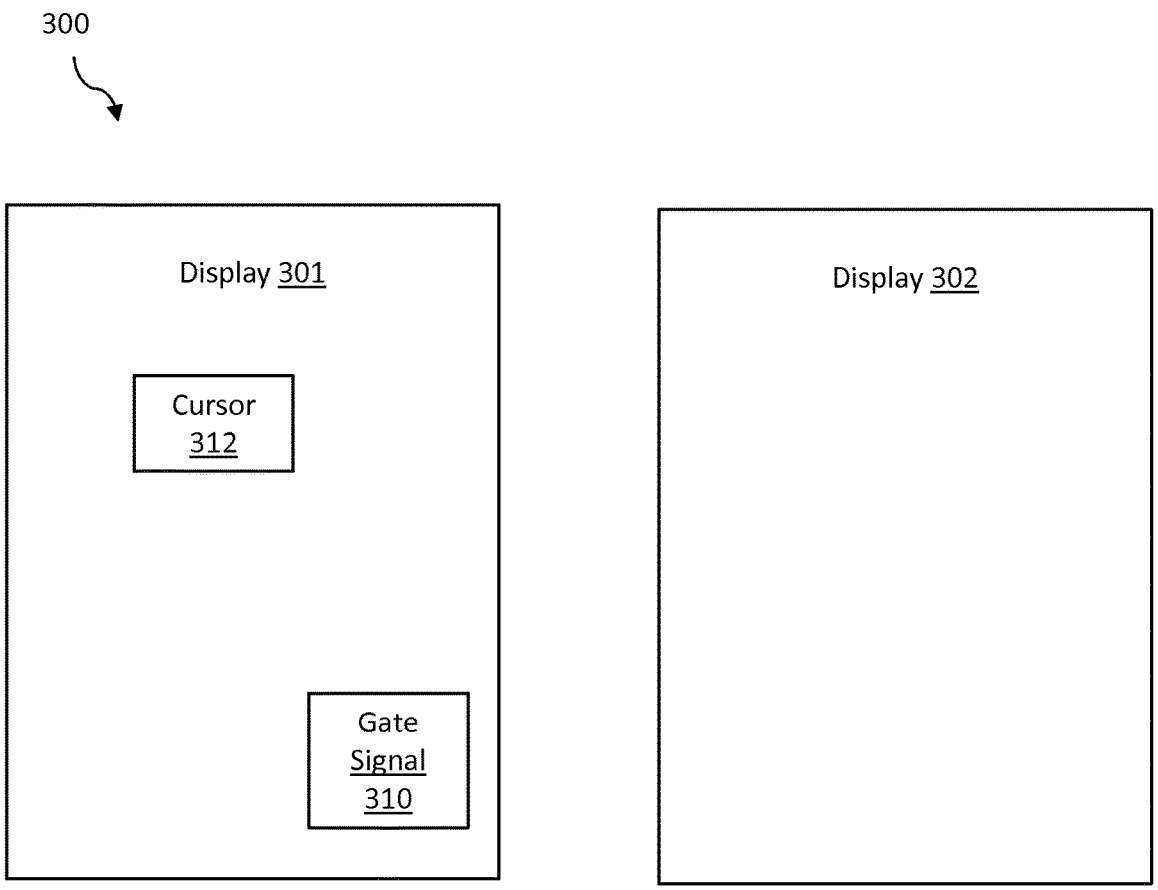
FIG. 3A illustrates screens of multiple displays when movement of an object between displays is prevented according to an embodiment.

FIG. 3A illustrates example screens (or user interfaces UIs) of multiple displays when movement of an object between displays is prevented according to an embodiment. System 300 includes a first display 301 and a second display 302. Here, the user has not provided an indicator that movement of an object between screens of the displays 301 and 302 should be allowed. Therefore, cursor 312, located on the screen of display 301 cannot be moved to the screen of display 302 (i.e., the 'gate' is closed). The user can use all of the edges of the screen of display 301 as backstops and need not be concerned with the cursor 312 inadvertently moving to the screen of the second display 302.

In an embodiment, a gate signal UI element 310 can indicate whether movement between screens of the displays 301 and 302 is allowed (i.e., a 'gate' is open or closed). The gate signal 310 can be a box, an icon, an image, an error, text, or any other visual indicator included in the UI. This gate signal 310 can be located in any suitable location in a UI on any of the displays 301 and 302. The gate signal 310 can provide a visual indicator to the user whether the user should expect to be able to move an object between screens of the displays 301 and 302. In the above example, the gate signal 310 would indicate to the user that movement between the screens of the displays 301 and 302 is not allowed (e.g., by appearing as a red circle, an 'X', or any other suitable signal indicating movement is not allowed).

Figure 3B:
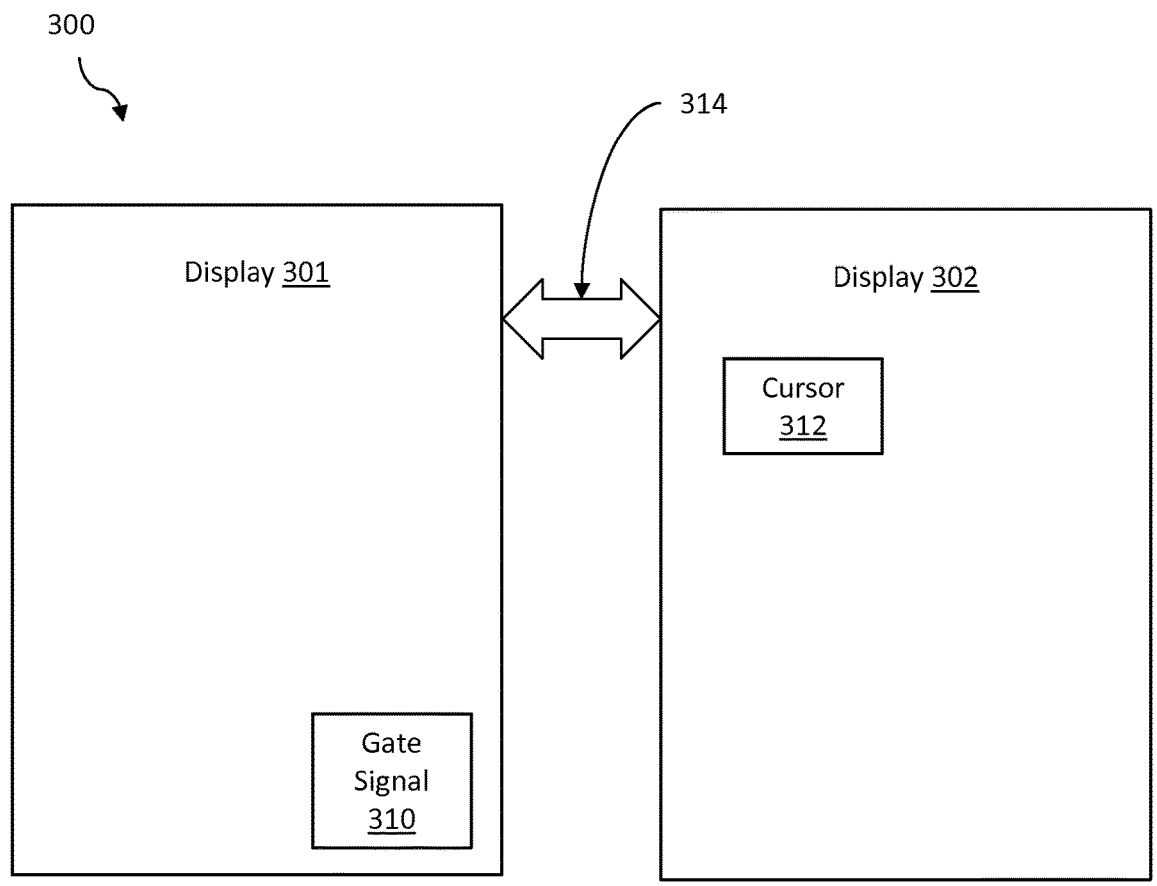
FIG. 3B illustrates screens of multiple displays when movement of an object between displays is allowed according to an embodiment.

FIG. 3B illustrates example screens (or UIs) of multiple displays when movement of an object between displays is allowed according to an embodiment. Here, the user has provided an indicator that movement of an object between screens of the displays 301 and 302 should be allowed. Therefore, objects located on the screen of display 301 can be moved to the screen of display 302 (i.e., the 'gate' is open). In this example, the first display 301 is located to the left of the second display 302. As a result, when the user moves the cursor 312 from the first display 301 to the second display 302, the cursor 312 appears to move off of the first display 301 through the right edge of the first display 301 and onto the second display 302 through the left edge of the second display 302, as shown by arrow 314. Further, the user could move the cursor 312 back to the first display 301 from the second display 302, as also shown by arrow 314. In this example, the gate signal 310 would indicate to the user that movement between the screens of the displays 301 and 302 is allowed (e.g., by a green circle, an arrow, or any other suitable indicator).

Figure 3C:
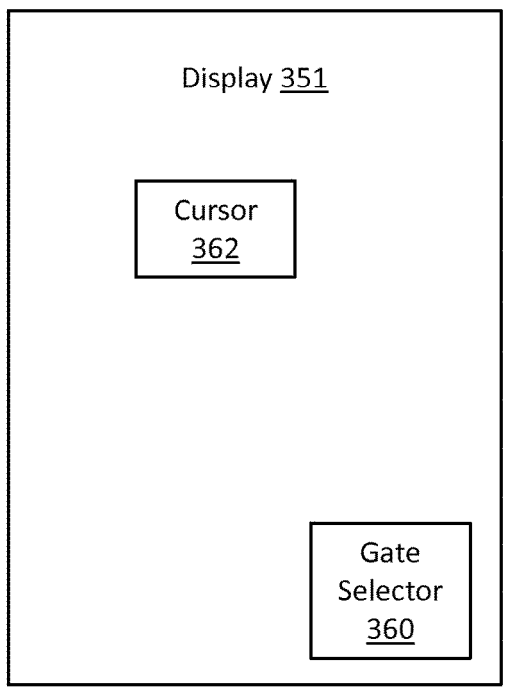
FIG. 3C illustrates screens of multiple displays with an on-screen gate selector when movement of an object between displays is prevented according to an embodiment.
Figure 3C:
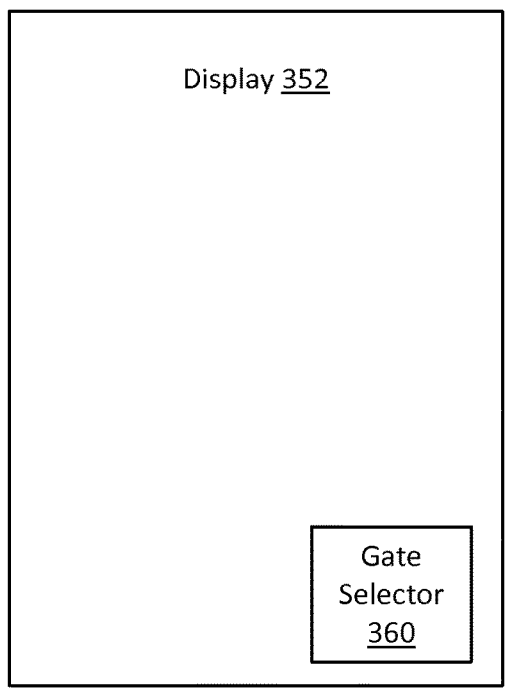

FIG. 3C illustrates example screens (UIs) of multiple displays when movement of an object between displays is prevented according to an embodiment. System 350 includes a first display 351 and a second display 352. Further, an on-screen gate selector 360 is located on the screens of each of the displays 351 and 352. The gate selector 360 can be a UI element such as a check box, an icon, a button, a slider or the like. Via the gate selector 360, a user can provide an indicator regarding whether movement between displays should be allowed. The user can select the gate selector 360 (or a portion of the gate selector 360) with the cursor 362 to provide the indicator. For example, the user can select a portion of the gate selector 360 labeled "open" to indicate that movement of an object between displays 351 and 352 is allowed and select a portion of the gate selector 360 labeled "close" to indicate that movement of an object between displays should be prevented.

In another example, the gate selector 360 is labeled "open" such that when the user selects the gate selector 360 with the cursor 362, movement of objects between the displays 351 and 352 is allowed. Once the user selects the gate selector 360 labeled "open" and movement is allowed, the label on the gate selector 360 changes to "close" such that when the user selects the gate selector 360 now labeled "close" movement of objects between the displays 351 and 352 is prevented.

Here, the user has not provided an indicator that movement of an object between screens of the displays 351 and 352 should be allowed. Therefore, cursor 362, located on the screen of display 351, cannot be moved to the screen of display 352 (i.e., the gate is closed). The user can use all of the edges of the screen of display 351 as backstops and need not be concerned with the cursor 362 inadvertently moving to the screen of the second display 352.

Figure 3D:
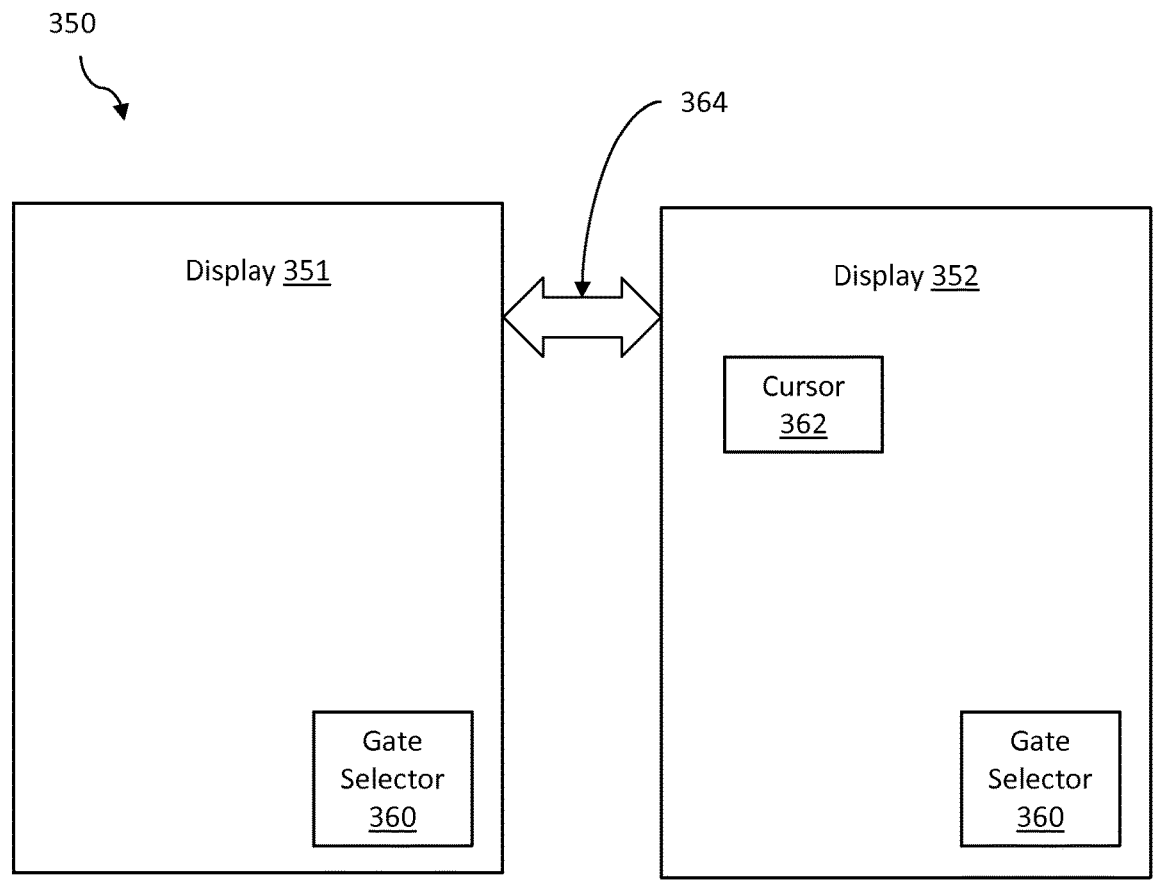
FIG. 3D illustrates screens of multiple displays with an on-screen gate selector when movement of an object between displays is allowed according to an embodiment.

FIG. 3D illustrates example screens (UIs) of multiple displays when movement of an object between displays is allowed according to an embodiment. Here, the user has provided an indicator that movement of an object between screens of the displays 351 and 352 should be allowed (e.g., by selecting at least a portion of the gate selector 360 labeled "open" with the cursor 362). Therefore, objects located on the screen of display 351 can be moved to the screen of display 352. In this example, the first display 351 is located to the left of the second display 352. As a result, when the user moves the cursor 362 from the first display 351 to the second display 352, the cursor 362 appears to move off of the first display 351 through the right edge of the first display 351 and onto the second display 352 through the left edge of the second display 352, as shown by arrow 364. Further, the user could move the cursor 362 back to the first display 351 from the second display 352, as also shown by arrow 364.

Figure 4:
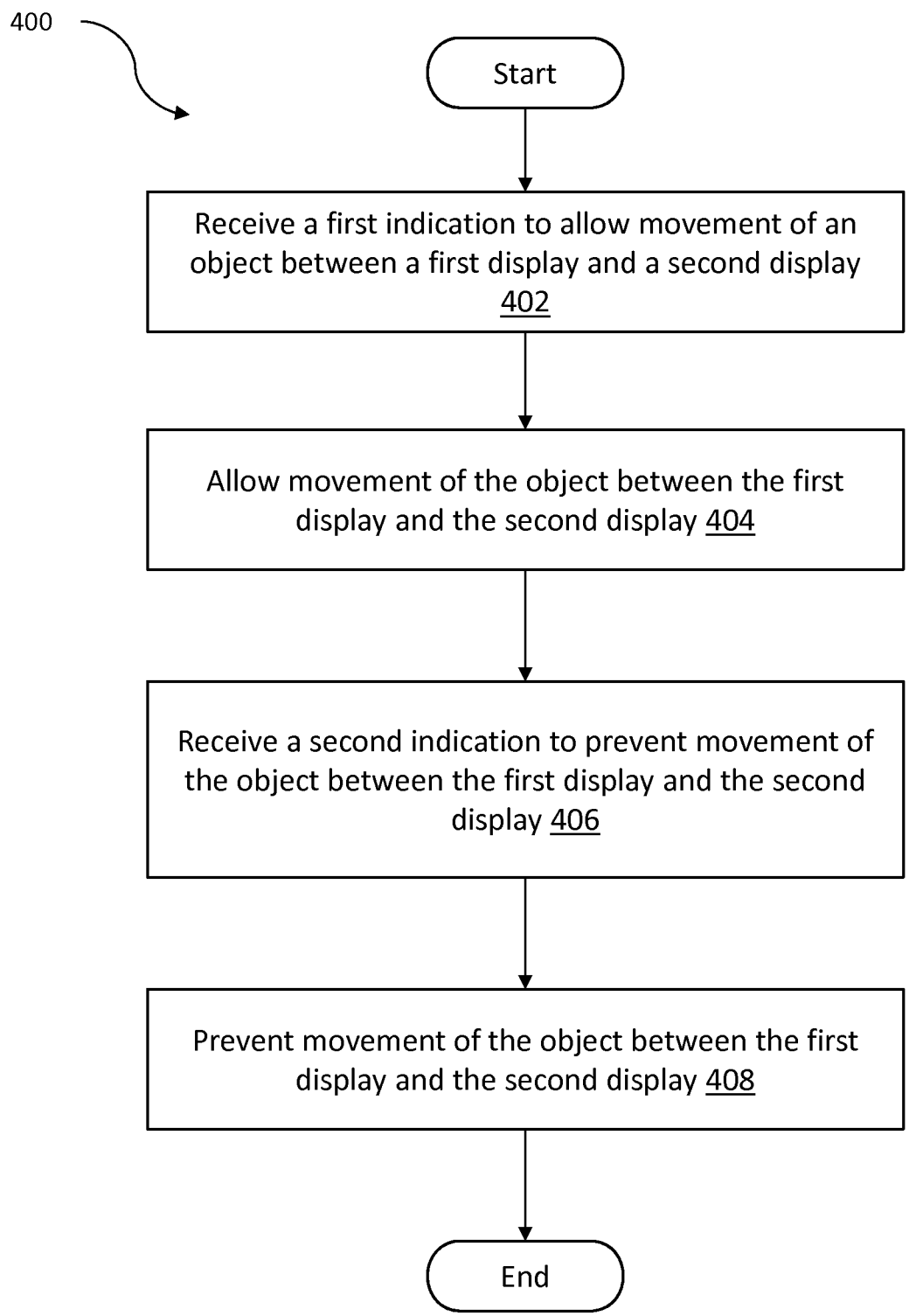
FIG. 4 illustrates a flow diagram of a method of managing multiple displays according to an embodiment.

FIG. 4 illustrates a method 400 of managing multiple displays according to one embodiment. The method 400 is performed by processing logic that may comprise hardware (circuitry, dedicated logic, etc.), software (such as is run on a general purpose computer system or a dedicated machine), or a combination of both. In one embodiment, the method 300 is performed by the window management system 210 of FIG. 2.

At block 402, a first indication to allow movement of an object between a first display and a second display is received. For example, the first indication can be pressing and/or holding a key on an input device, such as a keyboard, or selecting of a button on the first display with a cursor.

At block 404, movement of the object between the first display and the second display is allowed. For example, the object can be a cursor or an application window. Once movement of the object is allowed, a user can move the object from the first display to the second display. In an embodiment, the user can also move the object back from the second display to the first display. For example, display management system 140 may detect a user attempt to move the object from the first display to the second display, determine that such movement is allowed, and cause the object to be moved from the first display to the second display.

At block 406, a second indication to prevent movement of the object between the first display and the second display is received. The second indication can be the pressing of another key on an input device or the releasing of a key that was held down (e.g., as the first indication). The second indication can also be the selection of a button on either the first display or the second display.

At block 408, movement of the object between the first display and the second display is prevent in response to receiving the second indication. In an embodiment, the object should now remain in the object's current screen. For example, if the object is a cursor, the cursor can no longer be moved between the first display and the second display. In another example, if the object is an application window, then the application window can no longer be moved between the first display and the second display. The user can now rely on an edge of a screen of the current display as a backstop when attempting to position the cursor on an object located at the edge of the screen. For example, display management system 140 may detect a user attempt to move the object outside the first display, determine that such movement is not allowed, and cause the object to remain on the screen of the first display.

Though method 400 has been described with respect to two displays for ease of explanation, embodiments of the method can be implement with more than two displays (e.g., three displays, four displays, or five displays). For example, a system of displays at an airport can have an administrator display, an arrivals display, and a departures display, where the administrator display is private, and the arrivals and departures displays are public. Here, the system can be set up such that movement is allowed between arrivals and departures, but public users are not able to move on the private administrator screen.

Figure 5:
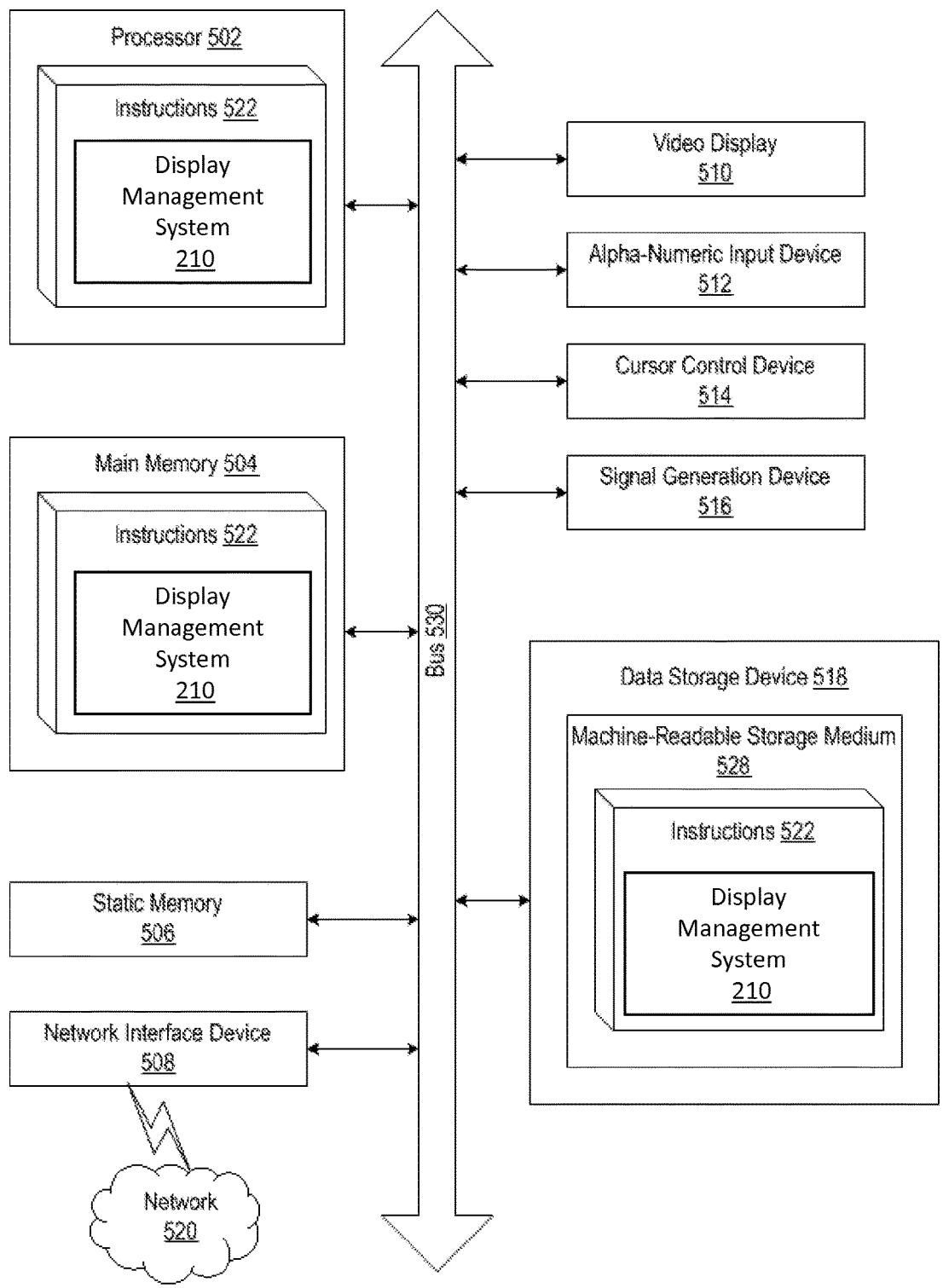
FIG. 5 illustrates a block diagram of an exemplary computer system that may perform one or more of the operations described herein.

FIG. 5 illustrates a diagram of a machine in the exemplary form of a computer system 500 within which a set of instructions, for causing the machine to perform any one or more of the methodologies discussed herein, may be executed. In alternative embodiments, the machine may be connected (e.g., networked) to other machines in a LAN, an intranet, an extranet, or the Internet. The machine may operate in the capacity of a server or a client machine in client-server network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a server, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The exemplary computer system 500 includes a processing device (processor) 502, a main memory 504 (e.g., read-only memory (ROM), flash memory, dynamic random access memory (DRAM) such as synchronous DRAM (SDRAM), double data rate (DDR SDRAM), or DRAM (RDRAM), etc.), a static memory 506 (e.g., flash memory, static random access memory (SRAM), etc.), and a data storage device 518, which communicate with each other via a bus 530.

Processor 502 represents one or more general-purpose processing devices such as a microprocessor, central processing unit, or the like. More particularly, the processor 502 may be a complex instruction set computing (CISC) microprocessor, reduced instruction set computing (RISC) microprocessor, very long instruction word (VLIW) microprocessor, or a processor implementing other instruction sets or processors implementing a combination of instruction sets.

The processor 502 may also be one or more special-purpose processing devices such as an application specific integrated circuit (ASIC), a field programmable gate array (FPGA), a digital signal processor (DSP), network processor, or the like. The processor 502 is configured to execute instructions 522 for performing the operations and steps discussed herein.

The computer system 500 may further include a network interface device 508. The computer system 500 also may include a video display unit 510 (e.g., a liquid crystal display (LCD) or a cathode ray tube (CRT)), an alphanumeric input device 512 (e.g., a keyboard), a cursor control device 514 (e.g., a mouse), and a signal generation device 516 (e.g., a speaker).

The data storage device 518 may include a computer-readable storage medium 528 on which is stored one or more sets of instructions 522 (e.g., software) embodying any one or more of the methodologies or functions described herein. The instructions 522 may also reside, completely or at least partially, within the main memory 504 and/or within the processor 502 during execution thereof by the computer system 500, the main memory 504 and the processor 502 also constituting computer-readable storage media. The instructions 522 may further be transmitted or received over a network 520 via the network interface device 508.

In one embodiment, the instructions 522 include instructions for a display management system (e.g., display management system 210 of FIG. 2). While the computer-readable storage medium 528 (machine-readable storage medium) is shown in an exemplary embodiment to be a single medium, the term "computer-readable storage medium" should be taken to include a single medium or multiple media (e.g., a centralized or distributed database, and/or associated caches and servers) that store the one or more sets of instructions. The term "computer-readable storage medium" shall also be taken to include any medium that is capable of storing, encoding or carrying a set of instructions for execution by the machine and that cause the machine to perform any one or more of the methodologies of the present invention. The term "computer-readable storage medium" shall accordingly be taken to include, but not be limited to, solid-state memories, optical media, and magnetic media.

In the foregoing description, numerous details are set forth. It will be apparent, however, to one of ordinary skill in the art having the benefit of this disclosure, that the present invention may be practiced without these specific details. In some instances, well-known structures and devices are shown in block diagram form, rather than in detail, in order to avoid obscuring the present invention.

Some portions of the detailed description have been presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "identifying", "determining", "configuring", "searching", "sending," "receiving," "requesting," "providing," "generating," "adding," or the like, refer to the actions and processes of a computer system, or similar electronic computing device, that manipulates and transforms data represented as physical (e.g., electronic) quantities within the computer system's registers and memories into other data similarly represented as physical quantities within the computer system memories or registers or other such information storage, transmission or display devices.

Certain embodiments of the present invention also relate to an apparatus for performing the operations herein. This apparatus may be constructed for the intended purposes, or it may comprise a general purpose computer selectively activated or reconfigured by a computer program stored in the computer. Such a computer program may be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions.

It is to be understood that the above description is intended to be illustrative, and not restrictive. Many other embodiments will be apparent to those of skill in the art upon reading and understanding the above description. The scope of the invention should, therefore, be determined with reference to the appended claims, along with the full scope of equivalents to which such claims are entitled.

What is claimed is:

1. A method comprising:

allowing, by default, movement of a cursor within a first screen of a first display of a plurality of displays while preventing movement of the cursor between the first screen and a second screen of a second display of the plurality of displays;

receiving, by a processing device, a first indication to allow movement of the cursor between the first screen and the second screen, wherein the first indication is a first selection of a graphical gate selector element presented on the first screen of the first display, the first selection enables subsequent movement of the cursor through a first edge of the first screen on the first display onto the second screen through a second edge of the second screen on the second display, and the first selection causes the graphical gate selector element to provide a visual indication that movement of the cursor between the first screen and the second screen is enabled;

allowing, by the processing device, movement of the cursor between the first screen and the second screen in view of the first indication;

receiving, by the processing device, a second indication to prevent movement of the cursor between the first screen and the second screen, wherein the second indication comprises a second selection of a second graphical gate selector element provided on the second screen of the second display; and preventing, by the processing device in view of the second indication, movement of the cursor between the first screen and the second screen while allowing movement of the cursor within the second screen while the first screen remains displayed on the first display.

2. The method of claim 1, wherein the second selection causes the second graphical gate selector element to provide a second visual indication that movement of the cursor between the first screen and the second screen is not enabled.

3. The method of claim 2, wherein the second visual indication comprises a label indicating that movement of the cursor between the first screen and the second screen is not enabled.

4. The method of claim 1, further comprising presenting the second graphical gate selector element on the second screen of the second display, wherein selection of the second graphical gate selector element is to at least one of enable or disable movement of the cursor through the second edge of the second screen on the second display onto the first screen through the first edge of the first screen on the first display.

5. A system comprising:
a memory; and
a processing device operatively coupled to the memory to:
allow, by default, movement of a cursor within a first screen of a first display of a plurality of displays while preventing movement of the cursor between the first screen and a second screen of a second display of the plurality of displays;
receive a first indication to allow movement of the cursor between the first screen and the second screen, wherein the first indication is a first selection of a graphical gate selector element presented on the first screen of the first display, the first selection enables subsequent movement of the cursor through a first edge of the first screen on the first display onto the second screen through a second edge of the second screen on the second display, and the first selection causes the graphical gate selector element to provide a visual indication that movement of the cursor between the first screen and the second screen is enabled;
allow movement of the cursor between the first screen and the second screen in view of the first indication;
receive a second indication to prevent movement of the cursor between the first screen and the second screen, wherein the second indication comprises a second selection of a second graphical gate selector element provided on the second screen of the second display; and
prevent, in view of the second indication, movement of the cursor between the first screen and the second screen while allowing movement of the cursor within the second screen while the first screen remains displayed on the first display.

6. The system of claim 5, wherein the second selection causes the second graphical gate selector element to provide a second visual indication that movement of the cursor between the first screen and the second screen is not enabled.

7. The system of claim 6, wherein the second visual indication comprises a label indicating that movement of the cursor between the first screen and the second screen is not enabled.

8. The system of claim 5, wherein the processing device is further to present the second graphical gate selector element on the second screen of the second display, wherein selection of the second graphical gate selector element is to at least one of enable or disable movement of the cursor through the second edge of the second screen on the second display onto the first screen through the first edge of the first screen on the first display.

9. A non-transitory computer-readable storage medium including instructions that, when executed by a processing device, cause the processing device to:
allow, by default, movement of a cursor within a first screen of a first display of a plurality of displays while preventing movement of the cursor between the first screen and a second screen of a second display of the plurality of displays;
receive a first indication to allow movement of the cursor between the first screen and the second screen, wherein the first indication is a first selection of a graphical gate selector element presented on the first screen of the first display, the first selection enables subsequent movement of the cursor through a first edge of the first screen on the first display onto the second screen through a second edge of the second screen on the second display, and the first selection causes the graphical gate selector element to provide a visual indication that movement of the cursor between the first screen and the second screen is enabled;
causing display of a graphical gate signal element on the first screen, the graphical gate signal element indicating that movement of the cursor between the first screen and the second screen is allowed
allow movement of the cursor between the first screen and the second screen in view of the first indication;
receive, by the processing device, a second indication to prevent movement of the cursor between the first screen and the second screen, wherein the second indication comprises a second selection of a second graphical gate selector element provided on the second screen of the second display; and
prevent, by the processing device in view of the second indication, movement of the cursor between the first screen and the second screen while allowing movement of the cursor within the second screen while the first screen remains displayed on the first display.

10. The non-transitory computer-readable storage medium of claim 9, wherein the second selection causes the second graphical gate selector element to provide a second visual indication that movement of the cursor between the first screen and the second screen is not enabled.

11. The non-transitory computer-readable storage medium of claim 10, wherein the second visual indication comprises a label indicating that movement of the cursor between the first screen and the second screen is not enabled.

12. The non-transitory computer-readable storage medium of claim 9, wherein the instructions further cause the processing device to present the second graphical gate selector element on the second screen of the second display, wherein selection of the second graphical gate selector element is to at least one of enable or disable movement of the cursor through the second edge of the second screen on the second display onto the first screen through the first edge of the first screen on the first display.

* * * * *